Aug. 7, 1951      R. O'REILLY      2,563,691
COOKING UTENSIL
Filed May 20, 1946      2 Sheets-Sheet 1
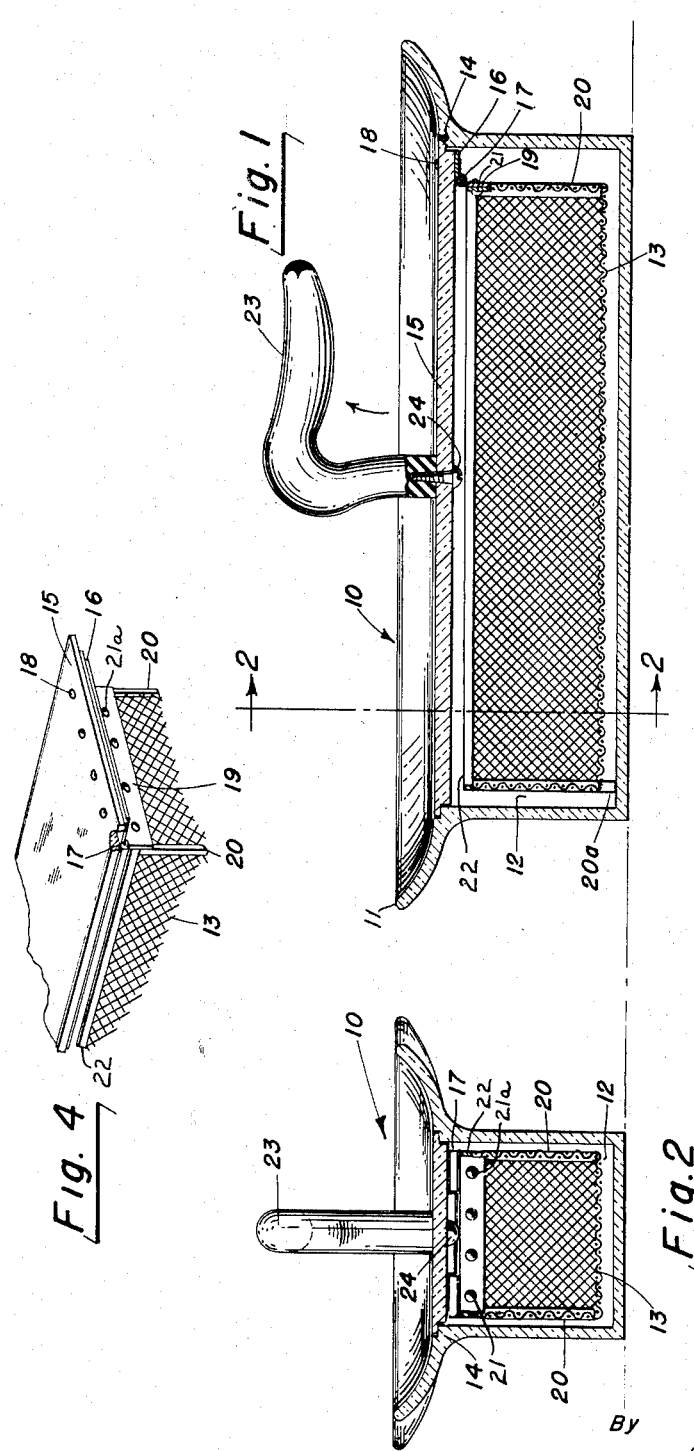
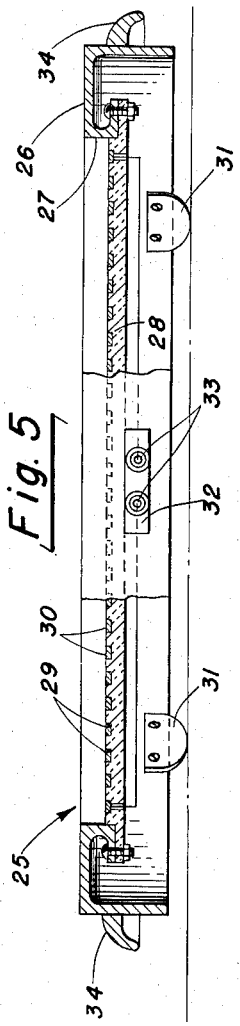
Inventor
Royal O'Reilly,
By
Pierce & Scheffler
Attorneys Aug. 7, 1951     R. O'REILLY     2,563,691
COOKING UTENSIL
Filed May 20, 1946     2 Sheets-Sheet 2
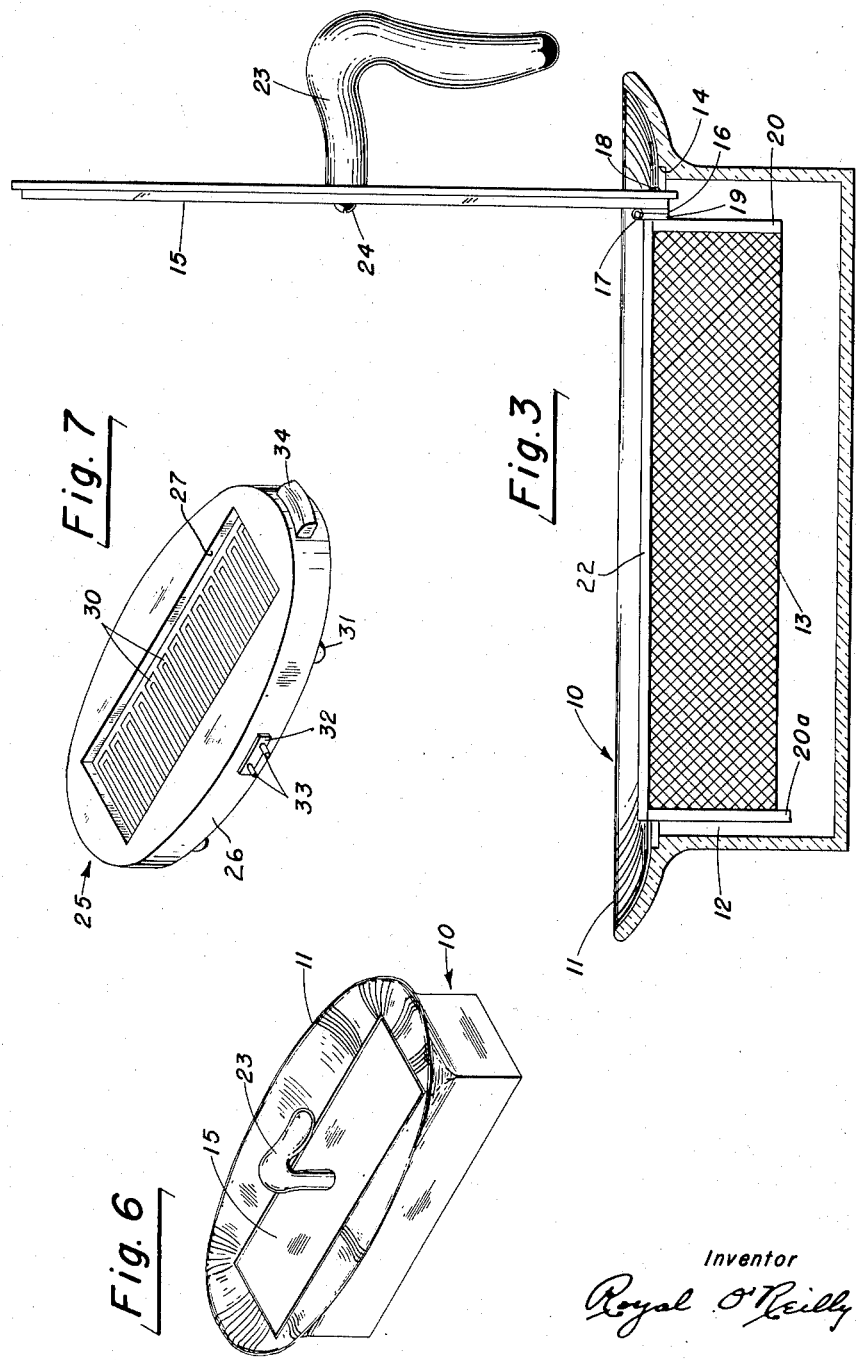
Inventor
Royal O'Reilly,
By
Pierce & Scheffler
Attorneys Patented Aug. 7, 1951

2,563,691

UNITED STATES PATENT OFFICE 2,563,691

COOKING UTENSIL

Royal O'Reilly, Juneau, Territory of Alaska

Application May 20, 1946, Serial No. 670,972

1 Claim. (Cl. 99—410)

This invention relates to cooking utensils and in particular to those of the so called "French frier" type in which the food is cooked in a basket of foraminous material that fits within a receptacle containing hot cooking grease.

The general object of the invention is to provide an improved cooking utensil of the general type described which is especially suitable for the cooking of strip types of food such as bacon and the like. Another object is to provide a deep fat cooking utensil having an improved construction for lifting the food basket out of the receptacle which contains the cooking fat.

A more specific object is to provide an improved covered cooking utensil having an inner food basket in which the basket and cover member are interconnected by a hinge joint that permits the basket to be removed easily, safely, and in a stabilized horizontal position after the cover has been opened to a vertical position. Yet another object is to provide a cooking utensil of the class described in which the food may be observed while being cooked. Still another object is to provide an improved electrically heated cooking utensil for table use.

The foregoing and other objects and advantages of the invention will become more apparent from the detailed description of a preferred embodiment of the invention which follows and from the accompanying drawings in which Fig. 1 is a vertical view in longitudinal section; Fig. 2 is a transverse section taken on lines 2—2 of Fig. 1. Fig. 3 is also a vertical longitudinal view, partly in section, showing the position of the cover and basket while being removed from the grease receptacle; Fig. 4 is an enlarged detail of the hinge connection between the cover and food basket; Fig. 5 is a vertical view in longitudinal section of the electric heater component of the cooking utensil; and Figs. 6 and 7 are perspective views on a somewhat reduced scale of the cooker and its associated electric heater unit.

Referring now to the drawings, the improved cooking utensil comprises a receptacle 10, preferably of glass that will stand a considerable amount of heat such as "Pyrex" and the like and through which the food may be observed while it is being cooked. The body portion of the receptacle is rectangular but broadens at the top into a generally oval shaped drip flange 11 that slopes towards the well portion 12 of the receptacle to catch and return grease drippings. A foraminous food basket 13, preferably made from woven wire of suitable mesh is provided for receiving the food to be cooked. Basket 13 is also shaped rectangularly and is so dimensioned that it fits somewhat loosely within the well 12.

While the length and width of the well 12 and basket 13 are not critical it is, nevertheless, preferred to make them slightly larger than the average strip of bacon which is approximately 9" x 2". The basket is preferably made deep enough to hold an average family size serving of bacon.

A rectangular ledge 14 is provided at the top of the well portion 12 on which a rectangular and flanged cover 15 is adapted to rest. Cover 15 prevents any of the hot fat from splashing out of the receptacle while the food is being cooked and may be made from heat resisting glass as illustrated, or of metal if desired. The cover is connected near one end to plate 16 of hinge 17 by rivets 18. The other plate 19 of the hinge is secured to a transverse reinforcing strip 21 across the top and at one end of basket 13 such as by rivets 21a. The basket is further reinforced at the ends by vertical strips 20, 20a and around the remaining three sides at the top by strip 22. The strips 20a are made somewhat longer than strips 20 and rest upon the bottom of well 12. As clearly seen from Fig. 1, strips 20a and cover 15 support the basket 13 in a horizontal position and in such manner that a space is provided between the bottom and the bottom of the receptacle well 12 which assures a continuous circulation of cooking fat beneath the bacon strips. The circulation of grease gently agitates the bacon strips and keeps them separated allowing all parts of each strip to be exposed to the cooking action of the hot grease.

A substantially right angled handle 23 is secured to cover plate 15 by suitable means such as screw 24 and is used for lifting the wire basket out of the receptacle after the bacon or other food has been cooked. In Fig. 1, basket 13 is shown in cooking position. When the cooking has been completed, the basket may be removed by grasping handle 23 and giving it a combined upward and turning motion in a clockwise direction as viewed from Fig. 1. This causes cover 15 to swing upwardly in the direction of the arrow, the right end acting as a pivot on the ledge 14, and raise the right end of basket 13. When cover 15 reaches a vertical position, hinge plate 16 will be stopped against the other hinge plate 19 as shown in Fig. 3 and the basket may now be removed in a stabilized horizontal position by lifting upwardly on handle 23. The basket is held for a moment in the position shown in Fig. 3 before serving the food therein to allow the surplus grease to drip back into the well 12. In the event that the basket is not held directly above well 12, grease drippings will be caught by flange 11 and directed back into the well.

After the food has been served from the basket, it may be returned to its position in the receptacle and the grease therein allowed to cool and solidify. The cover 15 which kept the hot grease from spattering during cooking now effectively seals the grease in the receptacle and the device can then be used as an attractive grease storing vessel.

The initial supply of cooking grease may be obtained by placing bacon in the receptacle without the basket or by rendering the bacon in the usual manner in a conventional frying pan. When the utensil is used for the cooking of bacon, it is obvious that the supply of grease will be self sustaining after it has once been put into use; in fact the grease level will of course rise as each batch of bacon is cooked and eventually the surplus must be removed.

The source of cooking heat is preferably supplied from an electric "hot-plate" unit 25 which is comprised of an oval sheet metal stamping 26 having a rectangular well portion 27, the bottom of which is constituted by a body member 28 of refractory material that is formed with a zigzag groove 29 for receiving a heating element 30. Well 27 is sized to snugly receive the receptacle 10 in order that all of the heat delivered by the heater element 30 will be concentrated on the bottom of the receptacle. The hot-plate 25 may be supported by a plurality of plastic feet 31 and connection to the heating element 30 is made through a conventional plug-in receptacle 32 containing male prongs 33.

In addition to furnishing a convenient source of heat energy for table use, the hot-plate 25 provides a convenient means for moving the cooking receptacle 10 about without danger of burning the hands on the hot glass as the metal stamping 26 will remain comparatively cool. If however additional protection is needed, insulating handles 34 may be attached to the hot-plate 25.

While the cooking utensil which has been described is preferably intended to be used with the welled electric hot-plate 25, it will be obvious that substantially equally satisfying results may be obtained from any other source of heat such as a gas or electric stove. Furthermore, while my improved utensil is especially suitable for cooking bacon strips, it will be obvious that it may be used for boiling eggs and the like at the table.

In conclusion, it is to be understood that while the construction illustrated is to be preferred, various changes in the construction and arrangement of parts may be made by those skilled in the art without departing from the spirit and scope of the invention as defined in the appended claim.

Having thus fully described and illustrated this invention, I claim:

A cooking utensil comprising an elongated receptacle, an elongated food basket of foraminous material adapted to rest within said receptacle, a rigid cover for said receptacle, hinge means connecting one end of said cover to said basket at one end of the latter, stop means limiting movement of said cover to an angular displacement of substantially 90° from its normal horizontal closed position on said receptacle and basket, said stop means being constituted by an end portion of said cover extending beyond said hinge means and which overhangs the end wall of said basket, said extended end portion being engageable with said end wall and being stopped thereby when said cover has been raised to a substantially vertical position, and a hand member carried by and rigid with said cover intermediate said hinge means and the other end of said cover whereby to enable the user to raise said cover to a substantially vertical position and also to lift said basket in a stabilized position of rest with respect to said handle from said receptacle with said cover in a substantially vertical position.

ROYAL O'REILLY.

REFERENCES CITED

The following references are of record in the file of this patent:

UNITED STATES PATENTS

| Number | Name | Date |
|---|---|---|
| 1,080,861 | St. John | Dec. 9, 1913 |
| 1,925,265 | Mabey | Sept. 5, 1933 |
| 2,186,855 | Baccarini | Jan. 9, 1940 |
| 2,244,168 | Miller | June 3, 1941 |
| 2,246,854 | Meletio | June 24, 1941 |